United States Patent [19]

Gockel et al.

[11] Patent Number: 4,702,085

[45] Date of Patent: Oct. 27, 1987

[54] METHOD AND APPARATUS FOR CONVERTING LOW TEMPERATURE HEAT INTO USEFUL HEAT

[75] Inventors: Karl-Heinz Gockel; Chapar Mostofizadeh-Ghalamfarsa, both of Essen, Fed. Rep. of Germany

[73] Assignee: Fried. Krupp Gesellschaft mit Beschränkter Haftung, Essen, Fed. Rep. of Germany

[21] Appl. No.: 871,771

[22] Filed: Jun. 6, 1986

[30] Foreign Application Priority Data

Jun. 7, 1985 [DE] Fed. Rep. of Germany ....... 3520565

[51] Int. Cl.$^4$ .............................................. F25B 15/00
[52] U.S. Cl. ....................................... 62/101; 62/476; 62/489
[58] Field of Search ............................ 62/101, 476, 489

[56] References Cited

U.S. PATENT DOCUMENTS 4,364,240 12/1982 Schulz et al. .......................... 62/489

FOREIGN PATENT DOCUMENTS 3424949 1/1986 Fed. Rep. of Germany .
69044 6/1977 Japan ..................................... 62/476

Primary Examiner—Albert W. Davis, Jr.
Attorney, Agent, or Firm—Spencer & Frank

[57] ABSTRACT

A process and apparatus for deriving useful heat from a low temperature waste heat-carrying fluid by means of a medium which can be divided into a strong solution in vapor form and a weak solution, the medium circulating in a closed circuit. Waste heat is used to divide the medium into the two solutions at low pressure, after which the strong solution is condensed, placed at increased pressure and then evaporated by receiving additional waste heat. The weak solution is placed at increased pressure and then mixed with the evaporated strong solution at increased pressure to absorb the latter and cause it to liberate heat. The resulting mixture is used to, successively, superheat the evaporated strong solution at increased pressure, heat the weak solution at increased pressure and heat the condensed strong solution at increased pressure, after which the pressure of the mixture is reduced to provide the medium which is divided into the two solutions. Part of the condensed strong solution at increased pressure is subjected to a pressure reduction and mixed with the weak solution at reduced pressure for adjusting the concentration of the weak solution.

21 Claims, 6 Drawing Figures

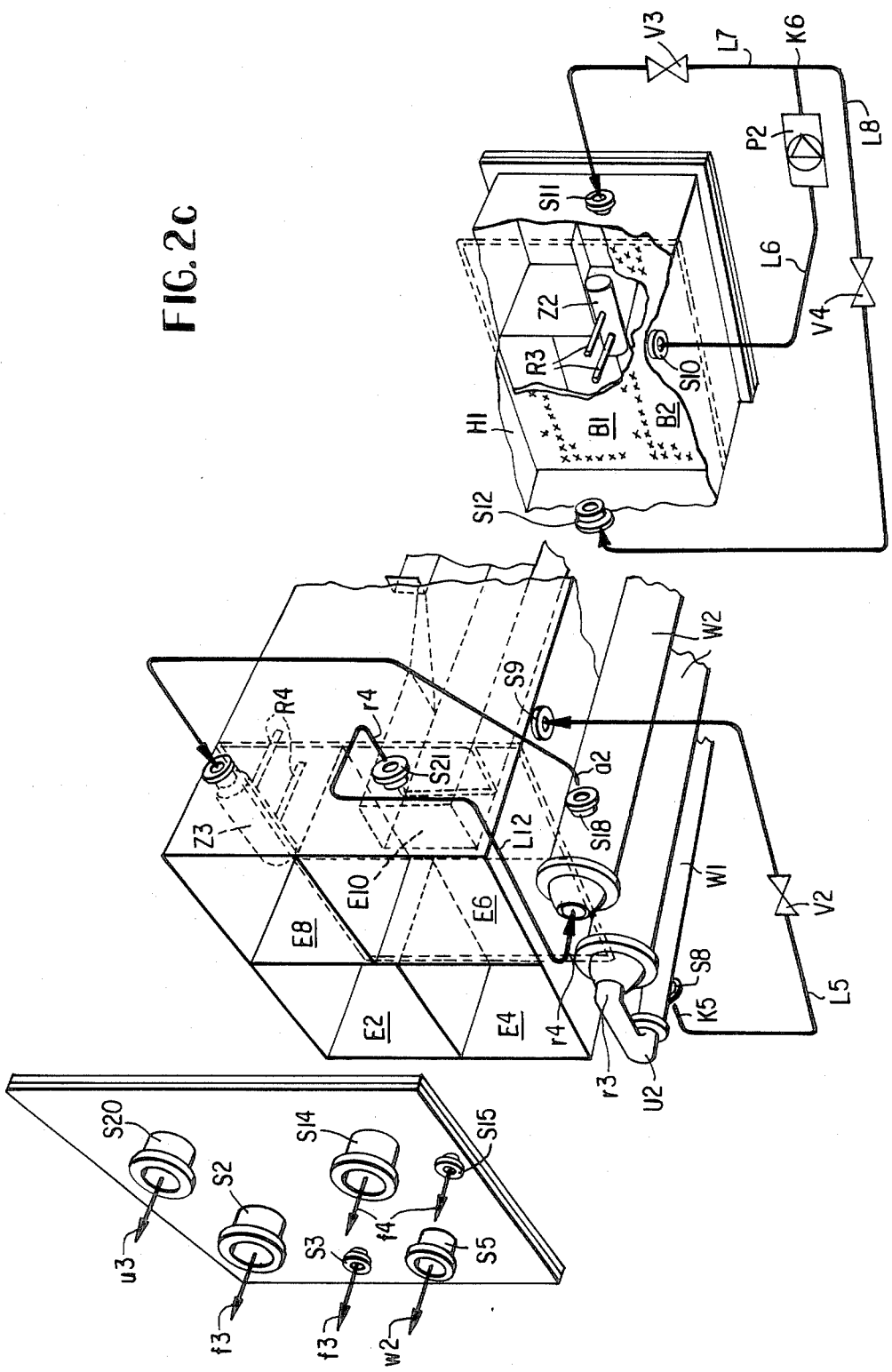

METHOD AND APPARATUS FOR CONVERTING LOW TEMPERATURE HEAT INTO USEFUL HEAT

BACKGROUND OF THE INVENTION

The present invention relates to a method and apparatus for converting low temperature heat into useful heat with the use of components, such as evaporators, absorbers, condensers and generator that are individually known in principle in the art.

The progressive exhaustion of energy resources and increasing energy prices have caused new technologies to be developed for more efficient and economical energy consumption. In many industrial processes, the majority of the energy consumed is dissipated as waste heat, as for example in drying, evaporation and distillation processes. In this case, the temperature of the waste heat is usally insufficient for direct utilization.

Only after this temperature has been raised, can the waste heat be converted to useful heat and used in the process or otherwise. It is known that this can be achieved with the aid of a heat transformer which is essentially composed of an generator, a condenser, an evaporator and an absorber. The generator and the evaporator receive the waste heat, while the absorber furnishes the useful heat and, in the condenser, the waste heat that has not been utilized is transferred to a cooling medium.

The state of the art heat transformers have the following drawbacks: complicated structures, pressure which is too far above or below atmospheric, limited useful temperature range, insufficient heat ratio and operation that is susceptible to malfunction. The result often is that heat recovery by heat transformation cannot be practiced economically, often primarily due to the high investment costs.

SUMMARY OF THE INVENTION

It is an object of the present invention to provide a method and an apparatus which avoid the above-mentioned drawbacks. In particular, the invention provides a compact heat transformer, composed of an improved arrangement of components which effectuates an improved process sequence for the substance streams.

The above and other objects are achieved, according to the invention, in a method for deriving useful heat from a medium having a low temperature, by performing the following sequence of steps in a closed circuit:

effecting a first heat exchange between a strong solution and an operating medium, which medium is in vapor form, for heating the operating medium;

effecting a secnd heat exchange between the strong solution coming from the first heat exchange and a weak solution for heating the weak solution;

effecting a third heat exchange between the strong solution coming from the second heat exchange and the operating medium, with the medium in liquid form, for heating the operating medium in liquid form;

evaporating at least part of the operating medium coming from the third heat exchange to produce operating medium in vapor form which is employed in the first heat exchange; and causing the operating medium coming from the first heat exchange to be absorbed by the weak solution coming from the second heat exchange for liberating useful heat by absorption.

The operating mixture has two components, that are a lower and a lighter boiling component. The lower boiling component is the operating medium and flows through the condenser means and the evaporator means. Until now only two component-mixtures are used, for example ammoniac/water, water/lithium bromide and trifluoride ethanol/tetraethylene glycol dimethyl ether (the lighter boiling component is in each case first called).

The operating mixture should have the following properties:

the distance of the boiling points of the lower and the lighter boiling component is great;
the lower boiling component has a great evaporation enthalpy
the vapour-pressures of both components are small;
the achievable useful temperature should be as great as possible;
the heat conductivity of the mixture should be good;
the operating mixture should not be inflammable and poisonous;
the operating mixture should be low priced.

A significant feature of the invention is that the strong solution coming from an absorber is initially utilized to superheat the operating medium vapor coming from an evaporator. This vapor is then fed to an absorber in superheated form. Moreover, the strong solution is utilized to heat the weak solution coming from a generator and the heated weak solution is likewise fed to the absorber where it is mixed with the superheated operating medium vapor and the useful heat produced during the subsequent absorption is utilized. Finally, the strong solution is also used to heat the operating medium condensate from a condenser before this condensate is fed to the evaporator.

According to a specific feature of the invention, the liquid operating medium is returned from the evaporator to the generator. The above-described method permit economical recovery of usable low-temperature heat.

To reduce the superheated state of the superheated operating medium vapor extracted from the generator, the vapor is conducted through a vapor saturator before it is fed to the condenser. Advantageously, part of the condensate extracted from the condenser is atomized in the mentioned vapor saturator so that the condensate evaporates while taking on the superheating heat.

Preferably, a mixture of trifluoroethanol and tetraethylene glycol dimethyl ether is used as the operating medium.

In further accordance with the invention, the above-described method is carried out in a novel apparatus. As a whole, this apparatus makes it possible for the first time to accommodate the essential components of the heat transformer, namely the generator, the condenser, the evaporator, the absorber and a vapor superheater, in a single housing below which further heat exchangers are disposed for heating the operating medium and the weak solution. The described arrangement has a compact structure which simultaneously considerably reduces manufacturing and construction costs compared to the prior art "split construction". Moreover, heat losses are greatly reduced.

With the use of the above-mentioned operating medium, a useful heat temperature of up to 150° C. can be realized from waste heat supplied at a temperature of from 80° to 90° C. Compared to the prior art, this constitutes a considerable improvement of the range of use, if one considers that conventional heat transformers, which operate, for example, on the basis of water/lithium bromide or ammoniac/water, reach useful temperatures no greater than 130° C. For water/lithium bromide these limits are set by the too narrow degasification range and for ammoniac/water by the uneconomically high pressures of more than 40 bar.

One embodiment of the invention is illustrated in the drawings.

BRIEF DESCRIPTION OF THE DRAWING

FIG. 2 is a simplified perspective view of an embodiment of apparatus, shown partly broken away, operating according to the invention.

FIG. 2c is an exploded perspective view of parts of the apparatus of FIG. 2a.

FIG. 2d is a detail view of a part of the apparatus of FIG. 2a.

DESCRIPTION OF THE PREFERRED EMBODIMENTS

Figure 1:
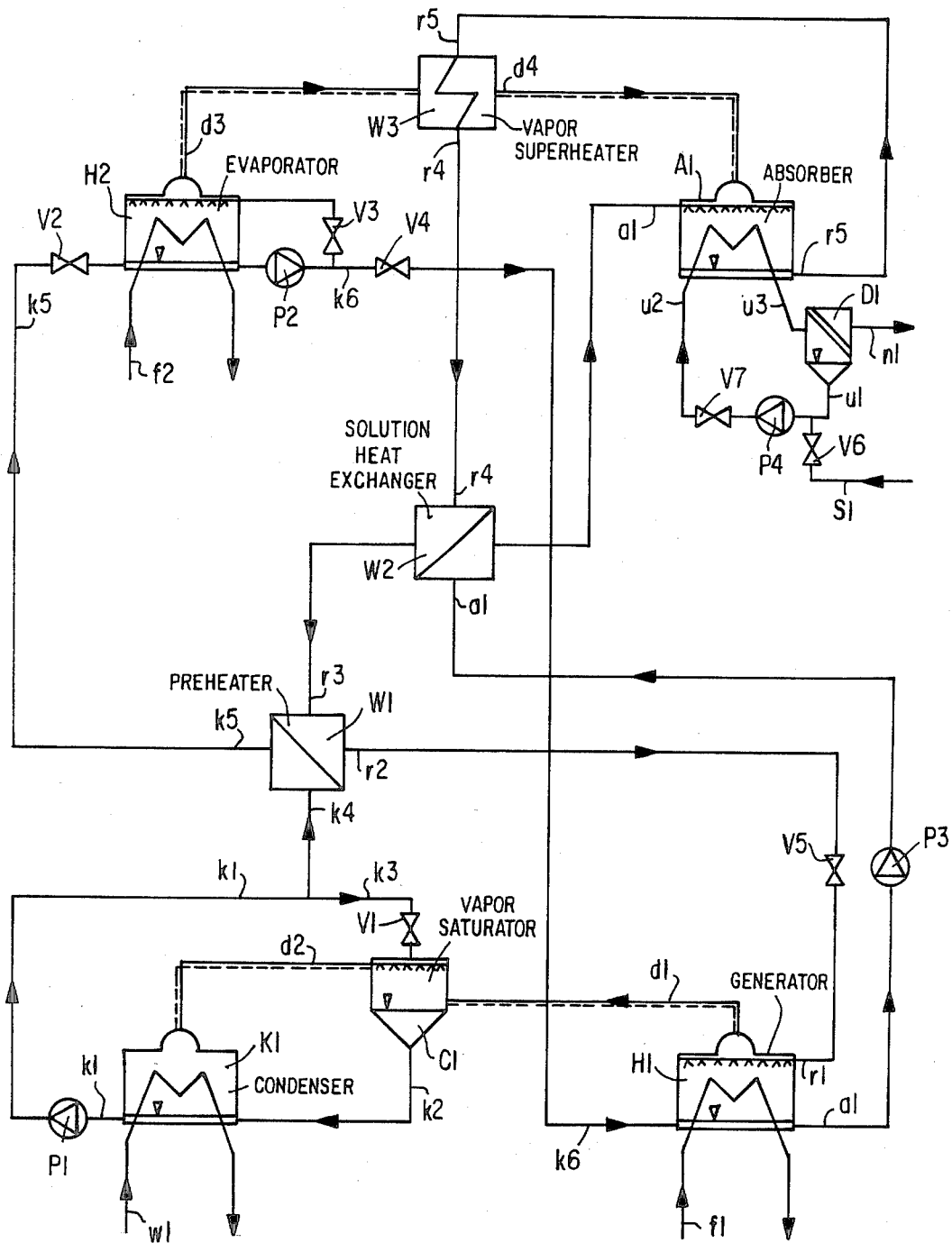
FIG. 1 is a diagram of a process for converting low temperature heat to useful heat according to the invention.

To facilitate understanding of the drawing, the various substance streams are identified with lower case letters and the apparatus components with upper case letters.

The apparatus according to the invention as shown in FIG. 1 is essentially composed of a generator, or stripper, H1, an absorber A1, a condenser K1, an evaporator H2 as well as a vapor superheater W3, a solution heat exchanger W2 and a preheater W1. Additionally, a vapor saturator C1 is connected between generator H1 and condenser K1.

According to FIG. 1, a strong solution r1 whose pressure has been reduced by passage through a pressure reducing valve V5 enters generator H1 and is sprayed onto horizontally disposed pipes through which flows an exhaust, or waste, heat-carrying medium, e.g. waste vapor f1. Vapor f1 gives up heat, e.g. by way of condensation, to solution r1, causing part of the strong solution to evaporate. Strong solution r1 is thereby divided into a component which has a lower boiling point, the operating medium vapor d1, and a weak solution a1.

The operating medium vapor d1 is in the superheated state when it leaves generator H1 and, for the purpose of reducing the superheated state, is introduced into vapor saturator C1 in which part of a condensate k3 is atomized. This causes part of condensate k3 to evaporate while absorbing the superheating heat from operating medium vapor d1.

The then saturated operating medium vapor d2 leaves vapor saturator C1 and is condensed at horizontal pipe bundles within condenser K1, which pipe bundles are cooled with cooling water w1 flowing therethrough. The resulting operating medium condensate is mixed with a partial stream k2 from vapor saturator C1 so that a total condensate stream k1 results which, after pump P1 has raised its pressure, is divided into partial streams k3 and k4. Valve V1 is provided to regulate the quantity of partial stream k3 for vapor saturator C1. Consequently, condenser K1 and generator H1 are disposed in a low pressure portion since the weak solution a1 discharged by generator H1 must first be brought to a higher pressure level by means of a pump P3.

The liquid operating medium partial stream k4 flows through a preheater W1 in which it is heated by the strong solution r3 flowing in countercurrent therewith. The heated operating medium k5 passes through a valve V2 into evaporator H2 and is there collected in a sump at the bottom of that evaporator. A sufficient quantity of the operating medium is stored in the sump so that a circulating pump P2 can pump operating medium spray through a valve V3 and into the top of evaporator H2, where the medium is sprayed onto horizontal evaporator pipes through which flows, as in the generator, an exhaust, or waste, heat carrier f2. Heat is transferred from carrier f2 to the sprayed operating medium, causing the sprayed operating medium to completely evaporate. A part k6 of the liquid operating medium leaving pump P2 is reduced in pressure by a valve V4 and returned to generator H1 for the purpose of equalizing the concentration, and the operating medium d3 evaporated in evaporator H2 enters vapor superheater W3 and takes up heat from the strong solution r5. The result is the superheated vapor d4.

The weak solution a1 formed in generator H1 is extracted therefrom and, after pump P3 has increased its pressure, is heated in a solution heat exchanger W2 by strong solution r4 coming from superheater W3 and flowing in countercurrent to solution a1.

The heated weak solution a2 coming from heat exchanger W2 is sprayed onto horizontal pipes of absorber A1 and is thus mixed with the likewise introduced superheated vapor d4. Thus the so-called absorption heat is released at a higher temperature which is then discharged as useful heat, for example for the generation of steam.

In the present case, feed water s1 is fed through a regulating valve V6 into a circulating system and mixes with circulated water u1. The mixed water u2 is pumped by a pump P4 and conveyed through a valve V7 into the horizontal pipes of absorber A1. Part of the mixed water evaporates by absorbing the absorption heat in absorber A1. The resulting water/vapor mixture u3 then passes through a vapor separator D1 from which useful vapor n1 is discharged.

The strong solution r5 produced by mixing the superheated operating medium vapor d4 with the weak solution a2 is cooled successively in the following components through which it passes in the listed sequence: initially in vapor superheater W3 (stream r4), then in solution heat exchanger W2 (stream r3) and finally in preheater W1 (stream r2). This causes the strong solution r1, after its pressure has been reduced in valve V5, to enter into generator H1, thus completing the circuit.

Figure 2A:
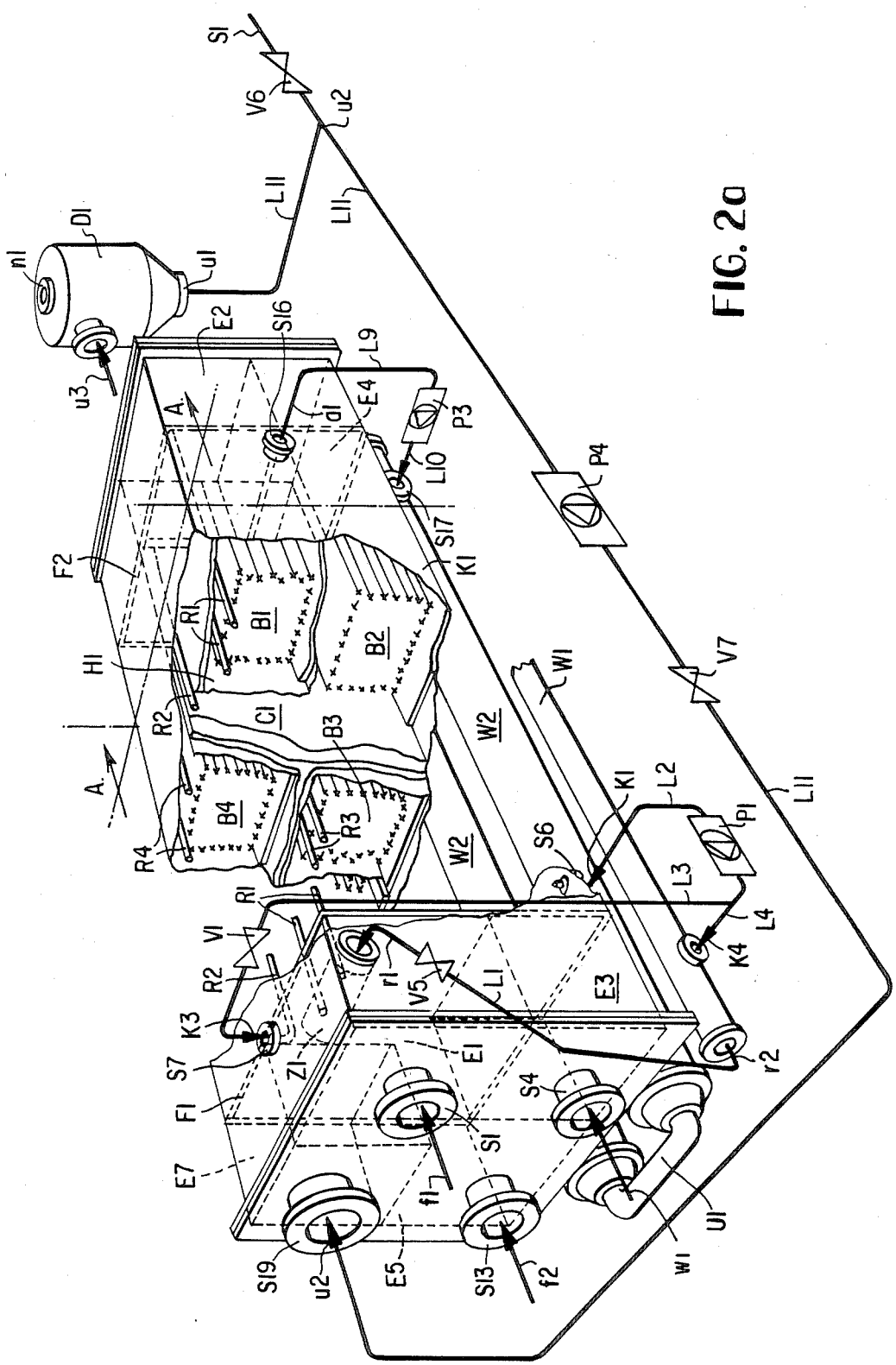
Figure 2B:
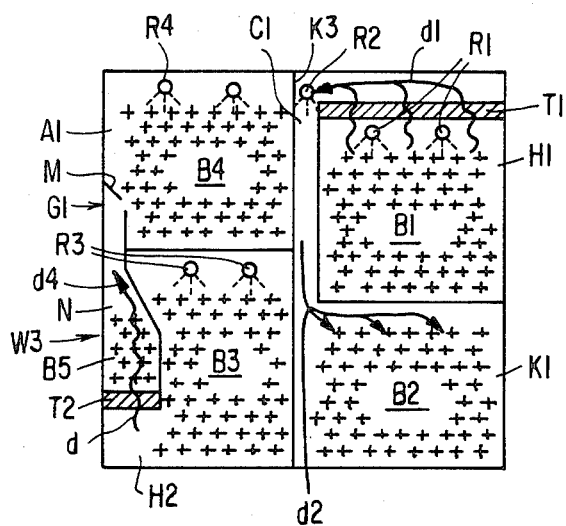
FIG. 2b is a cross-sectional view along line A—A of FIG. 2c.
Figure 2D:
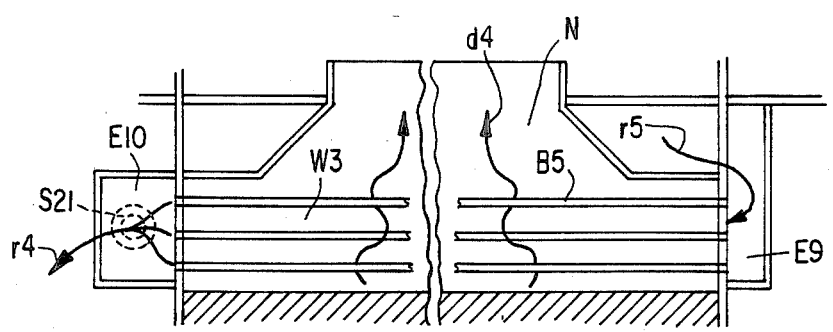

FIGS. 2a to 2d show various details of the apparatus for implementing the above-described method. FIG. 2b is a sectional view along line A—A, while FIGS. 2c and 2d are schematic rear and side views, respectively, of FIGS. 2a and 2b, respectively.

According to FIG. 2a, the strong solution r1 is conducted through conduit L1 into a collector Z1 of generator H1 and flows from there through distribution pipes R1 whose lower regions are provided with distributor, or spray, nozzles through which the solution is uniformly distributed to the horizontal pipe bundle B1 of generator H1. The waste heat carrying medium f1, fed into an inlet chamber E1 through a pipe S1, flows through the pipes bundle B1. After giving off heat to the strong solution, the waste heat carrying medium is removed, as streams f3 shown in FIG. 2c, via outlet chamber E2, the gaseous component flowing through pipe S2 and the liquid component through pipe S3. This occurs if the heat removal from f1 is accompanied by partial condensation of the waste heat carrying medium which is present, for example, as a vapor/air mixture.

The resulting operating medium vapor d1, as shown in FIG. 2b, passes through a liquid separator T1 and then enters vapor saturator C1 in which condensate k3 is sprayed through a distribution pipe R2. After reducing its superheated state, the saturated operating medium vapor d2 condenses in condenser K1 (FIGS. 2a and 2b) by heat exchange at a horizontally arranged pipe bundle B2 through which flows cooling water w1. Cooling water w1 leaves pipe bundle B2, after taking up heat, as stream w2 through outlet chamber E4 and pipe S5.

Below pipe bundle B2, the condensed operating medium and the sprayed-in partial stream k3 are mixed to form mixture k1 which flows through pipe S6 provided at the bottom and conduit L2 to pump P1 where, after the pressure of the mixture has been increased, it is divided into the two partial streams k3 and k4 (FIG. 2a).

Partial stream k3 is fed into distributing pipe R2 of vapor saturator C1 through conduit L3, regulating valve V1 and pipe S7 and is used for spraying (FIG. 2a), while the remainder k4 flows through preheater W1 and leaves the latter, after being heated, through pipe S8 (FIG. 2c) as heated operating medium k5. The heated operating medium k5 then flows through conduit L5, regulating valve V2 and pipe S9 into the sump of evaporator H2 (FIG. 2b). From there, as shown in FIG. 2c, the liquid operating medium is withdrawn by pump P2 through pipe S10 and conduit L6 and is conveyed through conduit L7, regulating valve V3 and pipe S11 into the collector Z2 of evaporator H2. The operating medium flows through distributor pipes R3 and is distributed, with the aid of nozzles attached at distributor pipes R3 to a horizontally arranged bundle of evaporator pipes B3 (FIGS. 2a to 2b), while part k6 flows back, for the purpose of equalizing the concentration, through line L8, valve V4 and pipe S12 into generator H1.

The supply of waste heat carrying medium f2 to the evaporator pipe bundle B3, according to FIG. 2a, is effected through pipe S13 and inlet chamber E5 of evaporator H2. The waste heat carrying medium f4 is discharged similarly to the manner described in connection with generator H1, through outlet chamber E6 and pipe S14 for the gaseous phase and pipe S15 for the condensed liquid phase of medium f4. The operating medium vapor d3, generated in evaporator H2, as shown in FIG. 2b, first flows through a droplet separator T2, then through pipe bundle B5 of vapor superheater W3 in cross current and, via a lock G1, enters the pipe bundle chamber of absorber A1 as superheated operating medium vapor d4. Referring to FIG. 2b, vapor d4 is absorbed by the weak solution in absorber A1, releasing useful heat.

Referring to FIG. 2a, the weak solution a1, flows out of generator H1 through pipe S16 and conduit L9 to pump P3 and, after being increased in pressure, passes through conduit L10 and pipe S17 into solution heat exchanger W2 where it is heated in countercurrent to the strong solution r4 (FIG. 2c). As indicated in FIG. 2a, the solution heat exchanger may be composed of a plurality of branches.

As shown in FIG. 2c, the weak solution a2 leaves solution heat exchanger W2 through pipe S18 and then flows to collector Z3 of absorber A1 where it is distributed through distributor pipes R4 and nozzles to pipe bundle B4 of absorber A1. The weak solution a2 takes on the superheated vapor d4 (FIG. 2b) and releases the useful heat to the heat carrying medium flowing through the pipes of bundle B4. Potable water s1 may be used, for example, as the useful heat carrying medium, which is fed through valve V6 into circulating conduit L11 shown in FIG. 2a. The circulating stream u2 is conveyed by means of circulating pump P4, through valve V7, pipe S19 and inlet chamber E7 and through pipe bundle B4 of absorber A1 where it takes on the useful heat and partially evaporates. The heated water/vapor mixture u3 passes through outlet chamber E8 and pipe S20 (FIG. 2c) to vapor separator D1. There the useful vapor n1 is separated and removed, and the liquid u1 is returned to the circulating conduit L11.

Absorption of the operating medium vapor by the weak solution a2 in absorber A1 creates a strong solution r5 which, according to FIG. 2d, flows through inlet chamber E9 of superheater W3 into the superheating pipe bundle B5 and leaves it, after cooling, through outlet chamber E10 and pipe S21. Then the strong solution r4 flows through conduit L12 to solution heat exchanger W2 (FIG. 2c) and heats the weak solution a1 in countercurrent.

In the present embodiment, solution heat exchanger W2 is composed of two branches which are connected with one another by a connecting conduit U1 (FIG. 2a). Likewise, the inlet of preheater W1 is connected with the outlet of solution heat exchanger W2 by a connecting conduit U2 through which flows the strong solution r3. After preheating the operating medium, the strong solution r2 enters conduit L1, is reduced in pressure by choke valve V5 and then enters the collector Z1 of generator H1. This closes the circuit.

Therefore, the described apparatus comprises, in particular, the features that pipe bundles B1 to B5 of the major components (generator, condenser, evaporator, absorber and vapor superheater) are composed of pipes which all end at two common planes F1 and F2 and, except for vapor superheater W3, are configured as horizontal tube spray apparatus whose inlet and outlet chambers are accommodated in a single housing. For the sake of clarity, the remaining walls of the housing are not shown in FIGS. 2a to 2d. Preheater W1, solution heat exchanger W2 and other assemblies, such as pumps P1 to P4 are disposed below this housing.

As shown in FIGS. 2c and 2d, vapor superheater W3 is formed to provide a vapor flow channel N which tapers in both directions transverse to vapor flow toward its outlet end, the outlet end having the form of a vapor exit lock. A metal sheet M is disposed directly above the outlet end of channel N, primarily to prevent fluid from flowing from absorber A1 directly into channel N.

Preferably, the apparatus operates with an operating mixture composed of trifluoroethanol/tetraethylene glycol dimethyl ether. With a waste heat temperature of about 100° C. (e.g. exhaust vapors), this mixture will provide a useful temperature of 150° C., with the ratio of useful heat to waste heat employed being 37%.

FIG. 1 shows the results of a calculated example under the following conditions:
  operating mixture: trifluoroethanol/tetraethylene glycol dimethyl ether (abbreviated: TFE/E 181);
  the waste vapor has 100° C. (1 bar) and heats the evaporator and the generator;

in the absorber there is generated useful vapor with a temperature of 156° C. (5.6 bar).

The concentrations in Kg Trifluoroethanol per kg mixture with the corresponding mass-flow in kg/s are the following

|  | concentration (kg/kg) | mass-flow (kg/s) |
|---|---|---|
| weak solution | 0.087 | 27.48 |
| strong solution | 0.272 | 34.47 |
| operation medium | 1.0 | 6.99 |
| operation medium vapour | 1.0 | 6.99 |

The heat output of the apparatus in kW, the temperatures in °C., the absolute pressures in bar and the power of the pumps in kW are set forth below.

| Conduit | Temperature °C. | Pressure bar absolute | Flow Rate kg/S |
|---|---|---|---|
| f1, input | 100 | 1.0 | 1.18 |
| f1, output | 98 | 1.0 | 1.18 |
| w1, input | 15 |  | 157.5 |
| w1, output | 20 |  | 157.5 |
| f2, input | 100 | 1.0 | 1.04 |
| f2, output | 98 | 1.0 | 1.04 |
| a1, upstream of P3 | 97.0 | 0.1 |  |
| a1, downstream of P3 | 97.2 | 2.4 |  |
| a1, downstream of W2 | 152.3 | 2.4 |  |
| d1 | 76.7 |  |  |
| d2 | 23.0 | 0.1 |  |
| d3 | 97.0 | 2.4 |  |
| d4 | 150.0 | 2.4 |  |
| k1, upstream of P1 | 23.0 |  |  |
| k1, downstream of P1 | 23.1 | 2.4 |  |
| k2 | 23.0 |  |  |
| k5 | 104.4 | 2.4 |  |
| n1 | 156 | 5.6 | 0.82 |
| r1 | 76.7 | 0.1 |  |
| r2 | 98.3 | 2.4 |  |
| r3 | 112.4 |  |  |
| r4 | 156.3 |  |  |
| r5 | 160 |  |  |
| S1 | 156 | 5.6 | 0.82 |
| Between V3 and H2 | 97.0 |  |  |

| Component | Heat Output or Power Consumed, kW |
|---|---|
| P1 | 3.3 |
| P2 | 2.5 |
| P3 | 27.8 |
| P4 | 3.9 |
| K1 | 3299 |
| W1 | 1052 |
| W2 | 3375 |
| W3 | 292 |

The generator and the evaporator need together 2652 kW+2348 kW=5000 kW.

The absorber emits 1714 kW useful heat, so that the heat balance is 1714/5000=0.34.

The drop in pressure of the apparatus is relatively small. The pressures in the evaporator and the absorber are absolute 2.4 bar absolute and in the generator and condenser 0.1 bar absolute. The throttle-valve causes a relaxation from 2.4 bar to 0.1 bar, in inverse proportion the pumps raise the pressure from 0.1 bar to 2.4 bar.

It will be understood that the above description of the present invention is susceptible to various modifications, changes and adaptations, and the same are intended to be comprehended within the meaning and range of equivalents of the appended claims.

What is claimed is:

1. A method for deriving useful heat from a fluid having a low temperature, comprising, in a closed circuit:
   effecting a first heat exchange between a strong solution and an operating medium, which medium is in vapor form, for heating the operating medium;
   effecting a second heat exchange between the strong solution coming from the first heat exchange and a weak solution for heating the weak solution;
   effecting a third heat exchange between the strong solution coming from the second heat exchange and the operating medium, with the medium in liquid form, for heating the operating medium in liquid form;
   evaporating at least part of the operating medium coming from the third heat exchange to produce operating medium in vapor form which is employed in the first heat exchange; and
   causing the operating medium coming from the first heat exchange to be absorbed by the weak solution coming from the second heat exchange for liberating useful heat by absorption.

2. A method as defined in claim 1 further comprising: dividing the strong solution coming from the third heat exchange into a first component constituting the operating medium, which medium is in vapor form, and a second component constituting the weak solution which is employed in the second heat exchange; condensing the operating medium produced by said dividing step to place the operating medium in liquid form; and supplying operating medium in liquid form produced by said condensing step to the third heat exchange.

3. A method as defined in claim 2 further comprising: mixing part of the operating medium coming from the third heat exchange with the weak solution produced in said dividing step; and supplying the resulting mixture to the second heat exchange.

4. A method as defined in claim 2 further comprising: placing the operating medium produced in said dividing step in saturated form before performing said condensing step.

5. A method as defined in claim 4 wherein said step of placing in saturated form comprises spraying condensed operating medium from said condensing step on the operating medium produced in said dividing step so that the condensed operating medium partially evaporates and absorbs heat from the operating medium produced in said dividing step.

6. A method as defined in claim 2 wherein the operating medium is a mixture of trifluoroethanol and tetraethylene glycol dimethyl ether.

7. Apparatus for deriving useful heat from a fluid having a low temperature, by heat exchange with a mass of a medium composed of a substance in solution and having a composition such that the medium can be divided into strong and weak solutions of the substance, said apparatus having the form of a closed circuit through which the medium is to circulate and comprising:
   generator means connected for receiving the medium and for dividing the medium into a strong solution and a weak solution, the strong solution constituting an operating medium and for placing the operating medium in vapor form;
   condenser means connected to said generator means for receiving the operating medium produced by said generator means and condensing the operating medium to place it in liquid form;

evaporator means connected to said condenser means for receiving at least a part of the operating medium in liquid form produced by said condenser means and for evaporating at least part of the operating medium supplied thereto;

absorber means connected to said evaporator means and said generator means to receive evaporated operating medium from said evaporator means and the weak solution from said generator means for causing the evaporated operating medium to be absorbed by the weak solution to liberate heat and produce the medium which is supplied to said generator means;

conduit means connected between said evaporator means and said generator means for supplying part of the medium in liquid form received by said evaporator means to said generator means to the weak solution formed in said generator means;

first heat exchanger means connected for effecting indirect heat exchange between the medium leaving said absorber means and the evaporated operating medium flowing between said evaporator means and said absorber means, for heating the evaporated operating medium;

second heat exchanger means connected for effecting indirect heat exchange between the medium leaving said absorber means, after passage of that medium through said first heat, generator means, and the weak solution flowing between said generator means and said absorber means, for heating the weak solution; and third heat exchanger means connected for effecting indirect heat exchange between the medium leaving said absorber means, after passage of that medium through said second heat exchanger means, and the operating medium in liquid form flowing between said condenser means and said evaporator means.

8. Apparatus as defined in claim 7 wherein each of said absorber means, generator means, evaporator means and condenser means comprises at least one horizontally extending distributor pipe for spraying a medium or solution received by that said means.

9. Apparatus as defined in claim 7 wherein: said generator means comprise a bundle of horizontal pipes for conducting an external fluid which transfers heat to the medium received by said generator means; said condenser means comprise a bundle of horizontal pipes for conducting an external fluid which absorbs heat from the operating medium received by said condenser means; said evaporator means comprise a bundle of horizontal pipes for conducting an external fluid which transfers heat to the operating medium received by said evaporator means; said absorber means comprise a bundle of horizontal pipes for conducting an external fluid which absorbs heat liberated when the evaporated operating medium is absorbed by the weak solution; and said first heat exchanger means comprise a bundle of horizontal pipes for conducting one of the media undergoing heat exchange in said first heat exchanger means.

10. Apparatus as defined in claim 9 comprising a single housing defining said generator means, condenser means, evaporator means, absorber means and first heat exchanger means and including two support plates supporting the ends of all of said bundles of horizontal pipes.

11. Apparatus as defined in claim 7 wherein: each of said generator means, evaporator means and absorber means comprises a horizontally oriented trickling device including a bundle of horizontal pipes and means for distributing a fluid material onto the pipes; in said generator means, said pipes are connected to conduct a waste heat carrying medium and the fluid material to be distributed by said means for distributing is the medium to be received by said generator means; in said evaporator means, said pipes are connected to conduct a waste heat carrying medium and the fluid material to be distributed by said means for distributing is the operating medium to be received by said evaporator means; and in said absorber means, said pipes are connected to conduct a useful heat-carrying medium which is heated by heat liberated in said absorber means and the fluid material to be distributed by said means for distributing is the evaporated operating medium received by said absorber means.

12. Apparatus as defined in claim 7 wherein said second and third heat exchanger means are each constructed to effect a countercurrent flow heat exchange.

13. Apparatus as defined in claim 7 further comprising vapor saturator means connected between said generator means and said condenser means for placing the operating medium produced in said generator means in the form of a saturated vapor.

14. Apparatus as defined in claim 13 wherein said vapor saturator means comprise means defining a chamber for receiving the operating medium in vapor form produced by said generator means, and at least one distributor pipe connected to receive operating medium in liquid form from said condenser means for spraying that operating medium into said chamber.

15. Apparatus as defined in claim 13 comprising a block-shaped housing containing said generator means, condenser means, evaporator means, absorber means, saturator means and first heat exchanger means, and wherein: said chamber of said saturator means has the form of a channel horizontally adjacent said generator means and communicating with said generator means for receiving the operating medium produced in said generator means, and said distributor pipe of said saturator means is horizontally adjacent said generator means and has nozzle shaped openings through which operating medium in liquid form is sprayed into said chamber; said condenser means are disposed below said generator means and below, and in communication with, said saturator means; said third heat exchanger means are connected between said condenser means and said evaporator means; said evaporator means comprise a bundle of horizontal pipes for conducting a waste heat carrying medium and at least one distributor pipe connected to receive the operating medium in liquid form received by said evaporator means and having nozzles for spraying that medium over said pipes; said absorber means are disposed above said evaporator means; and said first heat exchanger means are disposed horizontally adjacent said evaporator means and comprise means defining a channel for conducting evaporated operating medium from said evaporator means to said absorber means.

16. Apparatus as defined in claim 15 wherein: said generator means comprise a liquid separator for separating liquid from the operating medium produced in said generator means; said chamber of said saturator means has a rectangular cross section; said third heat exchanger means has a tubular form; and said first heat exchanger means comprise a droplet separator at the end of said channel directed toward said evaporator means.

17. Apparatus as defined in claim 15 wherein: said generator means comprise a bundle of horizontal pipes for conducting an external fluid which transfers heat to the medium received by said generator means; said condenser means comprise a bundle of horizontal pipes for conducting an external fluid which absorbs heat from the operating medium received by said condenser means; said absorber means comprise a bundle of horizontal pipes for conducting an external fluid which absorbs heat liberated when the evaporated operating medium is absorbed by the weak solution; said first heat exchanger means comprise a bundle of horizontal pipes for conducting the medium leaving said absorber means; and said block shaped housing further comprises a plurality of inlet chambers and a plurality of outlet chambers, each of said inlet chambers being connected to supply fluid to a respective one of said bundles of pipes and each of said outlet chambers being connected to receive fluid from a respective one of said bundles of pipes.

18. Apparatus as defined in claim 15 wherein said first heat exchanger means comprise means defining a vapor exit lock at the end of said channel directed toward said absorber means.

19. Apparatus as defined in claim 18 wherein said channel of said first heat exchanger means is tapered in the direction of vapor flow from said evaporator means toward said absorber means, and said first heat exchanger means comprise a metal cover sheet above said exit lock.

20. Apparatus as defined in claim 7 wherein: said generator means comprise means defining a first chamber, at least two first distributor pipes for spraying the medium received by said generator means into said first chamber of said generator means, and a first collector connected to said first distributor pipes for supplying thereto the medium received by said generator means; said evaporator means comprise means defining a second chamber; at least two second distributor pipes for spraying the operating medium received by said evaporator means into said second chamber, and a second collector connected to said second distributor pipes for supplying thereto the medium received by said evaporator means; and said absorber means comprise means defining a third chamber, at least two third distributor pipes for spraying the weak solution received by said absorber means into said third chamber, and a third collector connected to said third distributor pipes for supplying thereto the weak solution received by said absorber means.

21. Apparatus as defined in claim 20 wherein each said collector comprises a cylindrical housing.

* * * * *